Patented Nov. 17, 1942

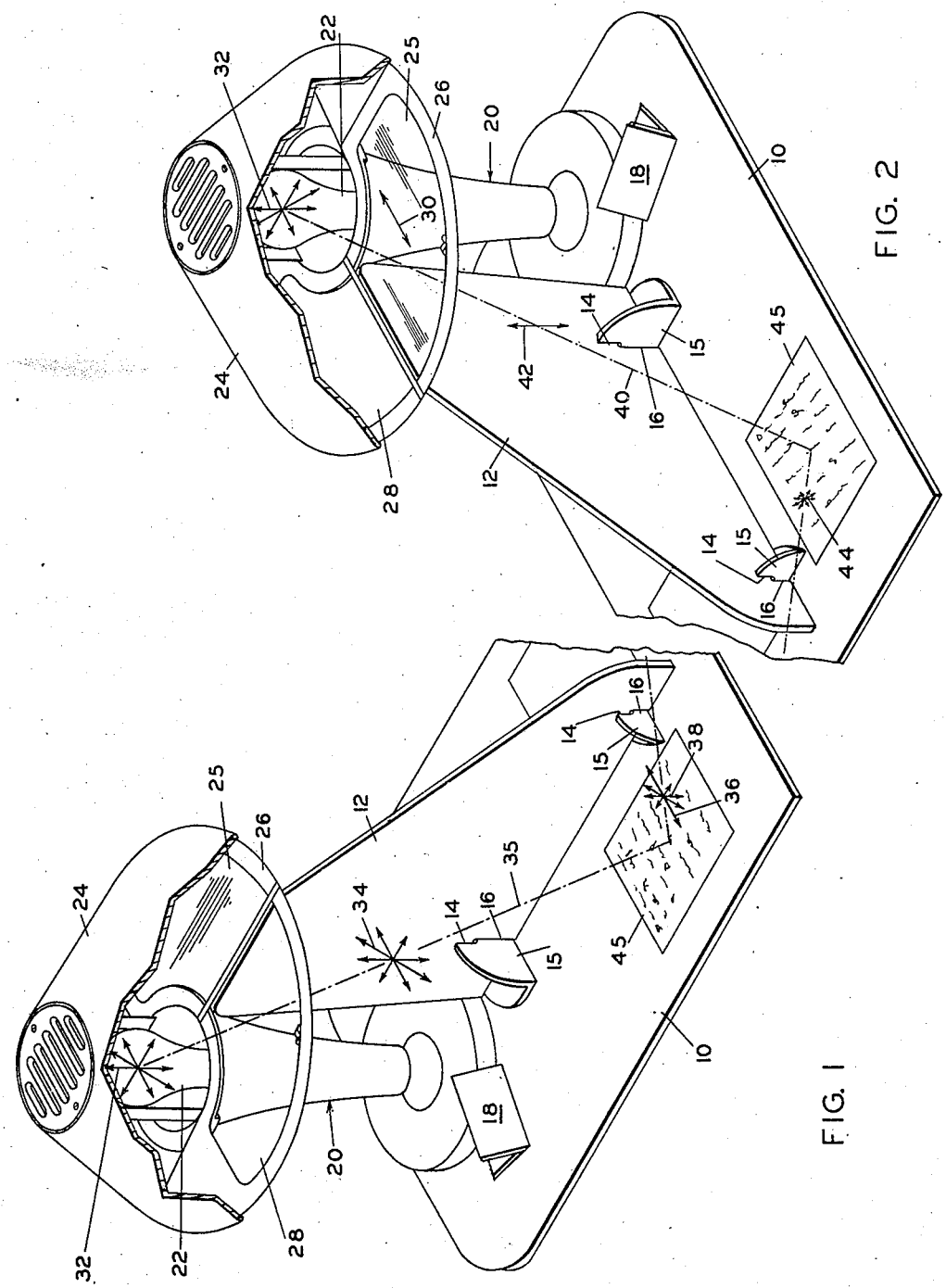

2,302,556

UNITED STATES PATENT OFFICE 2,302,556

DISPLAY DEVICE

Richard T. Kriebel, Auburndale, Mass., assignor to Polaroid Corporation, Dover, Del., a corporation of Delaware Application November 27, 1940, Serial No. 367,413

5 Claims. (Cl. 35—50)

This invention relates to display devices, and more particularly to display devices employing polarized light.

It is a particular object of this invention to provide a display device by which the glare-free nature of appropriately polarized light may be demonstrated conveniently and simply.

Another object is to provide such a display device wherein a beam of light is projected on to a reflecting surface at substantially the polarizing angle of incidence and means are provided for dividing said beam, for absorbing the horizontally vibrating component of one of the divided portions of said beam, and for distinguishing the area of said surface illuminated by said polarized portion from the area illuminated by the remainder of said beam.

Another object is to provide such a display device in inexpensive, portable and easily assembled form.

Other objects and advantages will in part appear and in part be pointed out in the course of the following description of one embodiment of the invention, which is given as a non-limiting example, in connection with the following drawing, in which:

Figure 1 is a view in perspective, partly broken away, of a complete display device embodying a form of the invention; and Figure 2 is a similar view wherein the perspective is at an angle of 90° to that in Fig. 1.

When a relatively flat surface or object is illuminated by a beam of light projected obliquely thereon, a person viewing said surface from a position approximately opposite the source of said beam receives the sensation of glare, the glare increasing as the angle of incidence of the beam of light approaches the polarizing angle of incidence. The display device of the present invention is designed particularly to demonstrate the fact that such glare may be prevented by removing from the projected beam the component vibrating parallel to said surface.

In the drawing, element 10 represents a relatively large, flat sheet of any suitable material such as cardboard which may be provided with a reflecting surface. Element 12 represents a fin member of any suitable, stiff material, for example, cardboard of the type used in element 10. Fin 12 is preferably positioned to divide the surface of element 10 into two substantially equal portions, and means are provided for holding said fin in its upright position. Simple means for this purpose comprise tabs 15 cut out and bent up from element 10 provided with slots 14 and adapted to engage slots 16 in the bottom edge of fin 12. Elements 18 represent tabs cut out and bent up from element 10 and which may, for example, bear advertising legends or other indicia.

Element 20 represents a lamp positioned to project light downward at approximately the polarizing angle of incidence on to the reflecting surface of element 10. Lamp 20 contains a conventional bulb 22 provided with a shade 24. Mounted within shade 24 is a frame 26 containing a sheet of light-polarizing material 25. As is shown by the drawing, element 25 is positioned to intercept about half of the light emitted by lamp 20, the other half of said light passing through the open portion 28 of frame 26.

Polarizing element 25 may comprise any suitable sheet polarizing material such, for example, as one of those sold under the trade name "Polaroid." As is indicated by arrow 30, it should be so positioned that its transmission axis is substantially parallel with the plane of incidence on element 10 of the beam emitted by lamp 20, and in this position it follows that it will absorb that component of said beam which is vibrating parallel to the surface of element 10.

It is believed that the operation of the above display device will now be apparent from the drawing. The beam of light emitted by bulb 22 is initially unpolarized, as is indicated by the bundle of arrows 32. Beam 35, which passes through open portion 28 of frame 26, continues in substantially unpolarized condition, as indicated by arrows 34, until it reaches the surface of element 10. A large portion of said beam, however, is specularly reflected and polarized to vibrate parallel to said surface, as is indicated by arrow 36, while the rest of the beam remains substantially unpolarized as is indicated by arrows 38. The predominance of this specularly reflected, horizontally vibrating component produces the sensation of glare when element 10 is viewed from a position approximately opposite lamp 20.

Referring to Fig. 2, beam 40, which passes through polarizer 25, is polarized to vibrate in a plane perpendicular to the surface of element 10, as is indicated by arrow 42, the component vibrating parallel to the surface of element 10 being removed by absorption within said polarizer. When said beam is incident upon the surface of element 10 and is reflected therefrom, it is substantially depolarized as is indicated by arrows 44. However, inasmuch as said beam contains no horizontally vibrating component, there is no tendency for it to be specularly reflected from the surface of element 10, even when incident thereon at the polarizing angle. It follows, therefore, that a person viewing said device from the same position as described above in connection with Fig. 1 will receive no sensation of glare.

In utilizing the display device of the invention, it is desirable to provide on the surface of element 10 suitable, relatively high reflecting areas such, for example, as photographs or written matter printed with relatively shiny ink. Such areas are indicated at 45. An observer positioned in front of said device will therefore be able to see simultaneously similar surfaces illuminated by unpolarized and vertically polarized light. Under such conditions, unpolarized light acting as described in connection with Fig. 1 will cause the said areas illuminated thereby to glare, and any writing or image therein will be indistinguishable. At the same time, the vertically polarized light will illuminate the other half of the surface of element 10 without glare, and writing or images therein will be readily seen or read. It must be understood that the device is effectively operative only when it is viewed from a position directly in front and substantially in line with beams 35 and 40.

It will be obvious that the above described device may be varied in many ways without departing from the scope of the invention. For example, base 10, fin 12 and the means for mounting the latter may be varied in many ways. It should also be pointed out that it is possible, within the scope of the invention, to insert in aperture 28 filtering means which will assist in demonstrating the contrast between a surface illuminated by light polarized to vibrate in a plane perpendicular thereto and a surface illuminated by light having different polarization characteristics. For example, there may be inserted in aperture 28 a sheet of light-absorbing material of such absorption characteristics as to reduce the intensity of beam 35 to an intensity substantially equal to that of polarized beam 40. As another example, there may be inserted in aperture 28 a polarizing filter adapted to impart to beam 35 polarization characteristics different from those of polarized beam 40. It is to be understood, therefore, that whenever beam 25 is described herein and in the claims as having different polarization characteristics from beam 40, said phrase is intended to cover unpolarized light or any other state of polarization for beam 35 than that wherein the horizontally vibrating component is removed.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A display device comprising, in combination, means providing a reflecting surface, means for projecting a beam of light obliquely on to said surface, means for dividing said surface into a plurality of separate areas, said means serving also to separate said beam into a plurality of beams, and means for polarizing one of said beams to vibrate in a plane perpendicular to said surface, the other of said beams having different polarization characteristics from said polarized beam.

2. A display device comprising, in combination, means providing a reflecting surface, means for projecting a beam of light obliquely on to said surface at approximately the polarizing angle of incidence, means for dividing said beam into a plurality of beams, means for distinguishing the area of said surface whereon one of said beams is incident from the corresponding area whereon the other of said beams is incident, and means for polarizing one of said beams to vibrate in a plane perpendicular to said surface, the other of said beams having different polarization characteristics from said polarized beam.

3. A display device comprising, in combination, means providing a reflecting surface, means for projecting a beam of light obliquely on to said surface at approximately the polarizing angle of incidence, means comprising a fin element mounted on said surface and positioned to divide the area thereof illuminated by said beam into a plurality of separate areas, said fin element being adapted to separate said beam into a plurality of beams, and means for polarizing one of said beams to vibrate in a plane perpendicular to said surface, the other of said beams having different polarization characteristics from said polarized beam.

4. A display device comprising, in combination, means providing a substantially flat reflecting surface, means for projecting a beam of light obliquely on to said surface at approximately the polarizing angle of incidence, means comprising a fin element mounted on said surface and positioned to divide the area thereof illuminated by said beam into a plurality of separate areas, said fin element being adapted to separate said beam into a plurality of beams, means comprising a light-polarizing element interposed in the path of one of said beams, and means for positioning said polarizing element with its transmission axis substantially parallel to the plane of incidence of said beam on said surface.

5. A display device comprising, in combination, means providing a substantially flat reflecting surface, means for projecting a beam of light obliquely on to said surface at approximately the polarizing angle of incidence, means comprising a fin element positioned to divide the area of said surface illuminated by said beam into a plurality of separate areas, means for holding said fin element in a position parallel to the direction of propagation of said beam and perpendicular to said surface, said fin element being of sufficient height to separate that portion of said beam incident on one of said separate areas from the portion incident on the other said separate area, and means for polarizing that portion of said beam incident on one of said areas to vibrate in a plane perpendicular to said surface, the other portion of said beam having different polarization characteristics from said polarized beam.

RICHARD T. KRIEBEL.